W. O. LONG.
HARROW ATTACHMENT FOR TRACTORS.
APPLICATION FILED JUNE 9, 1920.

1,412,124.

Patented Apr. 11, 1922.

Inventor
W. O. Long
By C. A. Snow & Co.
Attorneys

Witness

W. O. LONG.
HARROW ATTACHMENT FOR TRACTORS.
APPLICATION FILED JUNE 9, 1920.
1,412,124.
Patented Apr. 11, 1922.
2 SHEETS—SHEET 2.
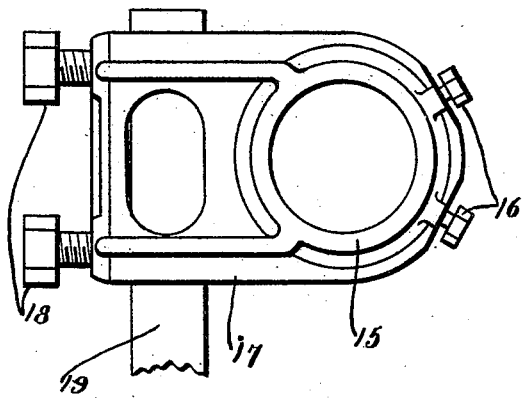
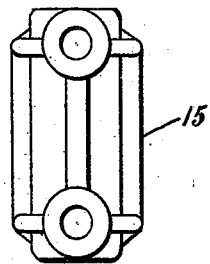
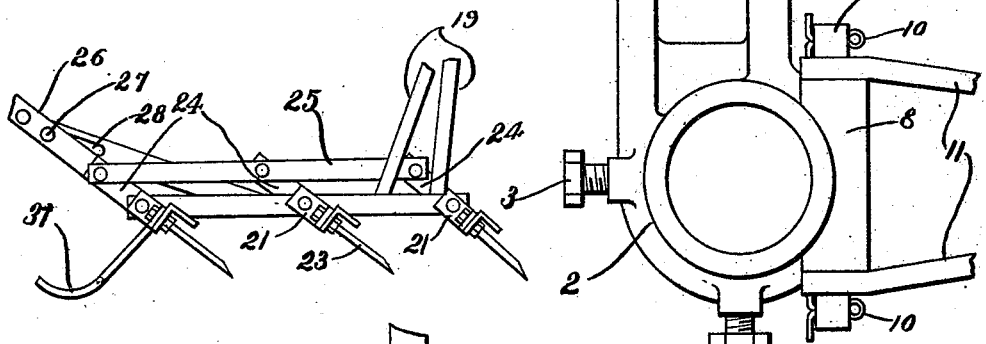
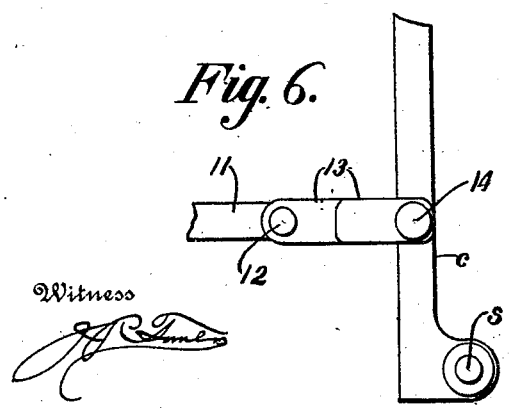
Inventor
W. O. Long.
By C. A. Snow & Co.
Attorneys

UNITED STATES PATENT OFFICE.

WILLARD O. LONG, OF DETROIT, MICHIGAN.

HARROW ATTACHMENT FOR TRACTORS.

1,412,124.  Specification of Letters Patent.  Patented Apr. 11, 1922.

Application filed June 9, 1920. Serial No. 387,694.

*To all whom it may concern:*

Be it known that I, WILLARD O. LONG, a citizen of the United States, residing at Detroit, in the county of Wayne and State of Michigan, have invented a new and useful Harrow Attachment for Tractors, of which the following is a specification.

This invention relates to harrows for use in connection with tractors and more especially with tractors of that type designed to draw various agricultural implements while the operator walks behind the tractor and controls its operation.

One of the objects of the invention is to provide simple and efficient means for connecting the harrow to the tractor in such a way that it can be adjusted toward or from the tractor and upwardly or downwardly to any predetermined position relative to the tractor and to the surface of the ground.

A further object is to provide a device of this character which can be attached readily to a tractor and which will operate efficiently.

A further object is to provide a harrow of this character which, when moved backwardly, by the backing of the tractor, will automatically collapse a limited extent so that the teeth will not dig into the soil but will glide thereover, the teeth of the harrow automatically assuming their normal or active position as soon as the tractor starts forward.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 3 is a side elevation of one of the clamps used in connection with the standards.

Figure 4 is a rear elevation of said clamp.

Figure 5 is a side elevation of the clamp of one of the braces.

Figure 6 is a plan view showing a connection between one of the braces and the cross bar of the tractor.

Figure 7 is an elevation of the rear portion of the harrow and showing the same partly folded, as when the harrow is being pushed rearwardly.

Figure 1:
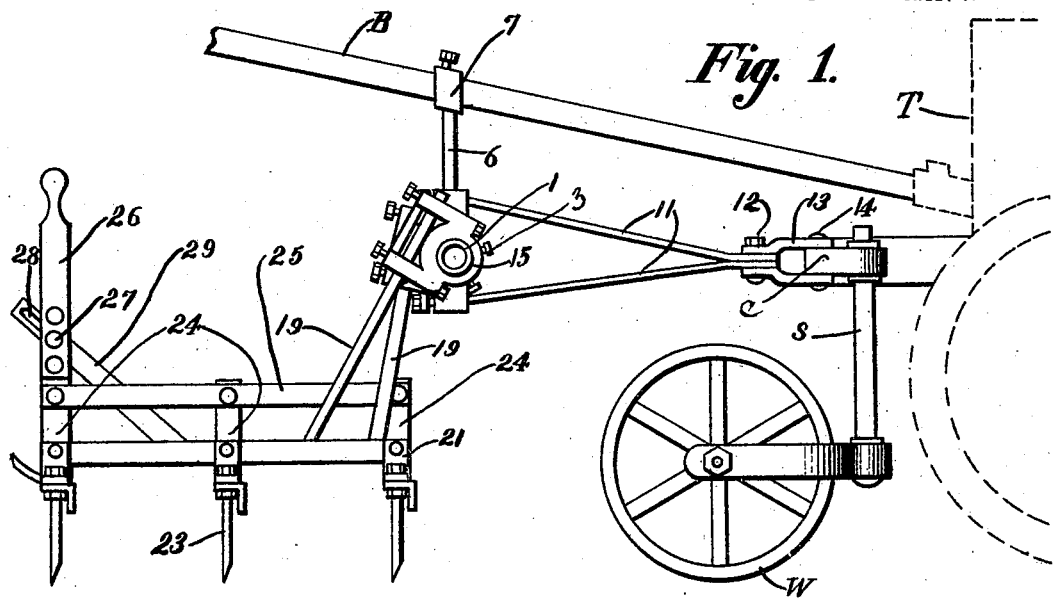
Figure 1 is a side elevation of the harrow, a portion of the tractor to which it is attached being shown by dotted lines.
Figure 2:
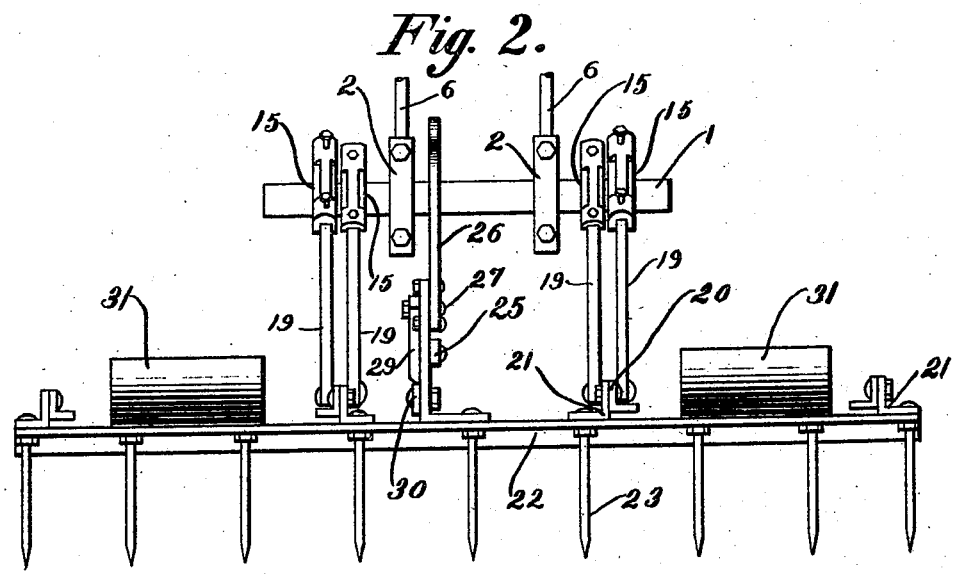
Figure 2 is a rear elevation of the attachment.

Referring to the figures by characters of reference 1 designates a tubular cross bar on which are mounted collars 2 adapted to be fastened securely to the cross bar by means of set screws 3. Extending upwardly from the collars are spaced ears 4 carrying a bolt 5 to which is connected the lower end of a supporting rod 6. This rod extends downwardly from a collar 7 which is mounted on the rearwardly extending handle bar B of the tractor indicated generally at T. The collars 2 have blocks 8 thereon through which extends a pivot pin 9 adapted to be held against withdrawal by means of cotter pins 10 or the like. Mounted on this pin 9 and bearing upon the ends of the blocks 8 are braces 11 which converge forwardly and are connected by a bolt 12 to attaching plates 13. These plates cooperate to form a fork which straddles the cross bar C of the tractor, the parts being connected by a pivot bolt 14. The cross bar C is engaged by the stems S of the caster wheels W of the tractor.

It will be obvious that by providing the bar 1 with two of these collars 2, each collar being provided with a supporting rod 6 and with the forwardly converging connecting bars or braces 11, the said bar 1 will be held rigidly relative to the tractor.

Mounted on the bar 1 at suitable points are collars 15 arranged in pairs. Each of these collars is adapted to be fastened securely to the bar 1 by set screws 16 or the like. Extending from each collar is a holding block 17 provided with set screws 18 and these set screws are adapted to clamp upon standards 19 which are insertible into the blocks 17. The standards 19 are arranged in pairs and extend upwardly from angle strips 20 which are pivotally connected to supporting brackets 21 attached to the transverse bars 22 of the harrow structure. These transverse bars carry the harrow teeth 23 and it is to be understood that any desired number of the bars may be provided, each of them being provided with brackets 21 and as the brackets are connected by the longitudinal angle strips 20, it will be seen that the parts are held properly assembled at all times. As before stated the standards 19 are arranged in pairs. One standard of each pair is connected to one of the strips 20 at a point in advance of the point of connection between the other standard 19 and the said strip. Thus the two standards will converge upwardly as shown in Figure 1.

The cross bars 22 are provided with upstanding arms 24 to which is pivotally connected a longitudinal bar 25. One of the arms 24 is extended upwardly to form a hand lever 26. This lever has a bolt 27 extending laterally therefrom and through a longitudinal slot 28 formed in a brace 29 which is pivotally connected to a longitudinal strip 30 attached to the lower portions of the arms 24. Thus it will be seen that when the harrow is drawn forwardly the frictional engagement of the harrow teeth with the ground will cause the lever 26 to swing rearwardly relative to the cross strip 22, bolt 27 sliding within the slot 28. During this rearward swinging of the lever, runners which have been indicated at 31 and which are attached to the rear cross strip 22, will move downwardly into contact with the soil and prevent the harrow from digging into the ground. These runners are curved upwardly and rearwardly as shown.

When it is desired to adjust the harrow forwardly close to the caster wheels W of the tractor, the collars 15 are loosened on the bar 1 and are swung downwardly and forwardly upon said bar so as to bring the front end of the harrow to the desired position. The set screws 18 are then loosened from engagement with the standards 19 so that said standards can be adjusted upwardly or downwardly relative to each other and to the beam 1 so as to bring the harrow to the desired level and angle. The various parts are then tightened and when the tractor is drawn forward the teeth of the harrow will operate upon the soil in the desired manner.

It will be apparent from the foregoing description that various adjustments of the harrow can be obtained readily, it being possible to adjust the same forwardly or rearwardly, upwardly or downwardly and to any desired angle simply by changing the relative positions of the standards 19 and collars 15.

What is claimed is:

1. The combination with a cross beam and means for connecting the same to a movably mounted structure, of separate collars adjustable angularly upon the beam and arranged in pairs, a harrow, and upwardly extending standards pivotally connected to the harrow and arranged in pairs, the standards of each pair converging upwardly and being connected adjustably to the collars of one pair.

2. The combination with a cross bar and means for connecting the same to a tractor or the like, of separate collars angularly adjustable upon the bar and disposed in pairs, a harrow, standards extending from and pivotally connected to the harrow, said standards being arranged in pairs, the standards of each pair converging upwardly, and means for adjustably connecting the standards of each pair to the collars of one pair.

3. The combination with a cross bar and means for connecting the same to a tractor or the like, of collars angularly adjustable on the bar and arranged in pairs, a harrow, front and rear standards pivotally connected to the harrow and arranged in pairs, the standards of each pair converging upwardly, and means for adjustably connecting the standards of each pair to the collars of one pair.

4. The combination with a cross bar and means for connecting the same to a tractor or the like, of collars mounted on the bar and adjustable angularly thereon, a holding block carried by each collar, a harrow, front and rear standards pivotally connected to the harrow and arranged in pairs, the standards of each pair being adjustable longitudinally within the block on one pair of collars, and means for securing the standards in adjusted positions within said blocks.

5. The combination with a cross bar and means for connecting the same to a tractor or the like, of collars adjustable angularly on the bar, slots carried by the respective collars, a harrow comprising cross strips, teeth extending therefrom, connections between the strips, said strips being mounted for rocking movement about their individual longitudinal axes, means upon the harrow for preventing rocking of the strips during the forward dragging of the teeth, and for limiting the rocking of the strips during the rearward dragging of the teeth, front and rear standards pivotally connected to the harrow and arranged in pairs, the standards of each pair converging upwardly, and means for securing said standards of each pair adjustably within the blocks of one pair of collars.

6. A harrow comprising cross strips, and teeth extending therefrom, pivotal connections between the cross strips, said strips being mounted for rocking movement about their individual longitudinal axes, cooperating means for holding said strips against rocking when the teeth are dragged forwardly and for allowing limited rocking movement of the strips when the teeth are drawn rearwardly, rearwardly and upwardly extending runners carried by the harrow for engagement with the surface of the soil when the strips are rocked during rearward movement of the harrow, a cross bar, means for connecting the cross bar to a tractor or the like, collars adjustable angularly on the cross bar, and standards extending from the harrow and adjustably connected to the collars, said standards being arranged in pairs and separately adjustable.

7. The combination with a cross bar, collars mounted thereon, supporting means attached to the collars, connecting bars, and pivotal connections between said bars and the collars, of supplemental collars arranged in pairs and adjustable angularly on the cross bar, standards adjustable longitudinally within said supplemental collars, the standards in the collars of each pair diverging downwardly, a soil engaging implement to which the lower ends of the standards are pivotally connected, the standards of each pair being separately adjustable to adjust said implement angularly, being adjustable collectively to adjust the implement bodily upwardly or downwardly, and being adjustable angularly upon the bar to shift the implement bodily forwardly or rearwardly relative to the bar.

In testimony that I claim the foregoing as my own, I have hereto affixed my signature in the presence of two witnesses.

WILLARD O. LONG.

Witnesses:
S. A. STRICKLAND,
LAWRENCE MILLER.